(12) United States Patent
Karlberg et al.

(10) Patent No.: US 11,868,328 B2
(45) Date of Patent: Jan. 9, 2024

(54) MULTI-RECORD INDEX STRUCTURE FOR KEY-VALUE STORES

(71) Applicant: Microsoft Technology Licensing, LLC, Redmond, WA (US)

(72) Inventors: Jan-Ove Almli Karlberg, Oslo (NO); Helge Grenager Solheim, Oslo (NO); Age Andre Kvalnes, Fetsund (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 17/625,258

(22) PCT Filed: Jul. 16, 2020

(86) PCT No.: PCT/US2020/042408
§ 371 (c)(1),
(2) Date: Jan. 6, 2022

(87) PCT Pub. No.: WO2021/016050
PCT Pub. Date: Jan. 28, 2021

(65) Prior Publication Data
US 2022/0253419 A1    Aug. 11, 2022

(30) Foreign Application Priority Data

Jul. 19, 2019    (EP) .................................... 19187413

(51) Int. Cl.
 G06F 16/00    (2019.01)
 G06F 16/22    (2019.01)
 G06F 16/28    (2019.01)
(52) U.S. Cl.
 CPC ........ G06F 16/2246 (2019.01); G06F 16/285 (2019.01)

(58) Field of Classification Search
None
See application file for complete search history.

(56) References Cited

U.S. PATENT DOCUMENTS 5,551,027 A    8/1996 Choy et al.
6,175,835 B1    1/2001 Shadmon
(Continued)

FOREIGN PATENT DOCUMENTS

WO    2014180178 A1    11/2014

OTHER PUBLICATIONS

"Notice of Allowance Issued in European Patent Application No. 19187413.0", dated Sep. 30, 2022, 7 Pages.
(Continued)

*Primary Examiner* — Anhtai V Tran
(74) *Attorney, Agent, or Firm* — Barta, Jones & Foley, PLLC

(57) ABSTRACT

A method of maintaining a key-value store comprising a first record structure in which each key comprises an index and each value comprises a respective set of item IDs, and a second record structure in which each key comprises an item ID and each value comprises a respective item of data. Each new item ID of a group is added, starting at the root level of a tree structure: I) determining whether the current record will exceed a maximum size limit if the new item ID is included therein, and if not, including the new item ID, but II) if so, identifying a number of records at the next level of the tree structure, and applying a deterministic transformation to the item ID of the new item to determine one of the identified number of records, and repeating from I) with the determined record now as the current record.

20 Claims, 6 Drawing Sheets

(56) References Cited

U.S. PATENT DOCUMENTS

| | | | |
|---|---|---|---|
| 2012/0102298 | A1 | 4/2012 | Sengupta |
| 2013/0007007 | A1 | 1/2013 | Pan et al. |
| 2015/0293960 | A1 | 10/2015 | Sharma et al. |
| 2017/0212680 | A1 | 7/2017 | Waghulde |
| 2017/0337229 | A1 | 11/2017 | Infante Suarez et al. |
| 2018/0225315 | A1* | 8/2018 | Boles ................ G06F 16/2455 |
| 2019/0012336 | A1* | 1/2019 | Schreter ............... H04L 67/562 |
| 2019/0095460 | A1* | 3/2019 | Wang .................. G06F 3/0647 |

OTHER PUBLICATIONS

"Notice of Allowance Issued in European Patent Application No. 19187413.0", dated Feb. 7, 2023, 7 Pages.

"Notice of Allowance Issued in European Patent Application No. 19187413.0", dated Feb. 23, 2023, 2 Pages.

"B+ tree", Retrieved from: https://en.wikipedia.org/w/index.php?title=B+tree&oldid=900764343, Jun. 7, 2019, 7 Pages.

"B-tree", Retrieved from: https://en.wikipedia.org/w/index.php?title=B-tree&oldid=906777417, Jul. 18, 2019, 15 Pages.

"Global Secondary Indexes", Retrieved from: https://web.archive.org/web/20131224203013/https:/docs.aws.amazon.com/amazondynamodb/latest/developerguide/GSI.html, Dec. 24, 2013, 4 Pages.

"Office Action Issued in European Patent Application No. 19187413.0", dated Nov. 18, 2021, 7 Pages.

"Extended European Search Report Issued In European Patent Application No. 19187413.0", dated Nov. 26, 2019, 9 Pages.

D'Silva, et al., "Secondary Indexing Techniques for Key-Value Stores: Two Rings to Rule Them All", In Proceedings of the Workshops of the EDBT/ICDT Joint Conference, Mar. 21, 2017, 10 Pages.

"International Search Report and Written Opinion Issued in PCT Application No. PCT/US20/042408", dated Sep. 7, 2020, 14 Pages.

\* cited by examiner

| Key (302) | Value (303) |
|---|---|
| Index0 | [ItemID_0-1, ItemID_0-2, ..., ItemID_0-N ] |
| Index1 | [ItemID_1-1, ItemID_1-2, ..., ItemID_1-N ] |
| Index2 | [ItemID_2-1, ItemID_2-2, ..., ItemID_2-N ] |
| ⋮ | ⋮     [Index Entries] → |

301 { (first row)

Records (key-value pairs) →

| Key (402) | Value (403) |
|---|---|
| ItemID_0-1 | Item (0, 1) |
| ItemID_0-2 | Item (0, 2) |
| ⋮ | ⋮ |
| ItemID_1-1 | Item (1, 1) |
| ItemID_1-2 | Item (1, 2) |
| ⋮ | ⋮ |
| ItemID_2-1 | Item (2, 2) |
| ItemID_2-2 | Item (2, 2) |
| ⋮ | ⋮ |

401 { (first row)

Records (key-value pairs) →

Key = Index (302)

Value = Set of Index Entries (303)
(storing individual item IDs 402)

| TenantA:siteX:PopularInSite:0 | HashProgressions: [null], IndexEntries: [ItemID_0-1, ItemID_0-2, ..., ItemID_0-N ] | b)

(302)　　　　　　　　　　(303)

| TenantA:siteX:PopularInSite:0 | HashProgressions: [2], IndexEntries: [ItemID_0-1, ItemID_0-2, ..., ItemID_0-N ] |

| TenantA:siteX:PopularInSite:1 | HashProgressions: [null], IndexEntries: [ItemID_1-1, ItemID_1-2, ..., ItemID_1-N ] |

| TenantA:siteX:PopularInSite:2 | HashProgressions: [null], IndexEntries: [ItemID_2-1, ItemID_2-2, ..., ItemID_2-N ] |

MULTI-RECORD INDEX STRUCTURE FOR KEY-VALUE STORES

BACKGROUND

As the number of users and applications around the world grows, there is an ever increasing need for more efficient management of storage of various data resources. These data resources may include for example: files such as spreadsheets, word processing documents, slide presentations, images, videos, etc.; stored communication histories such as emails, IM chat history, etc.; user profile information such as contact details, social media profiles, etc.; and/or sites such as websites, document sharing sites, etc. Such data resources may originate from a variety of applications installed on the users' terminals and/or hosted online, such as word processing applications, spreadsheet applications, social media applications, file sharing applications, etc.

Online storage has grown in popularity. Using online storage, such data resources can be stored online on the "cloud", meaning the data resources are stored on a server system accessible via the Internet, the server system typically comprising multiple server units implemented in more than one storage centre and/or geographic region (i.e. geographical location). Techniques for distributed storage and processing via a network such as the Internet are known in the art.

Typically a provider of a storage service such as a cloud storage service will provide server storage space and associated software tools to host the data resources of one or more other parties, referred to as "tenants" of the service. For instance each tenant may be a different organization (e.g. company, charity, or academic or government institution), with multiple users within the organization (e.g. the employees of the company or such like). The tenant may use the provided storage service for the benefit of users within their organization, and/or external to the organization. For instance the service may enable users within an organization to make their own data resources (e.g. documents, communication history, profile info, etc.) available to other users within the same organization (e.g. company). E.g. this may allow one or more other users to view a data resource of a first user, subscribe to updates to the data resource, or even modify the data resource.

A known scheme for storage and retrieval is referred to as a key-value store, based on a system of key-value pairs. Each key-value pair comprises a respective key, and a respective value (the data payload of the key-value pair) mapped to the respective key by the storage service. The storage service provides a retrieval function and an application programming interface (API) by which a requesting application of a tenant or other user can submit a key to the retrieval function. In response, the retrieval function retrieves the respective value based on the submitted key, and returns the retrieved value to the requesting application via the API.

Examples of key-value storage schemes include DynamoDB, Oracle NoSQL, Cassandra, MemcacheDB, and Couchbase Server.

SUMMARY

However, an issue with existing key-value storage schemes is that they often impose a restriction on the size of the value in each key-value pair (i.e. a limit on the amount of data that can be stored in a given value, such as a maximum number of KB or MB). This can be an issue not only for storing actual items of user data or data content, or the like, but also even for storing records of item IDs in index structures that index such items. It would be desirable to provide a mechanism for building larger data structures on top of a scheme of size-restricted key-value pairs.

According to one aspect disclosed herein, there is provided computer-implemented method comprising maintaining a key-value store comprising multiple records, wherein each record comprises a respective key and a respective value mapped to the respective key, wherein each value is restricted to a maximum size limit in terms of quantity of data. The key-value store comprises A) a first record structure in which each key comprises a different index and each value comprises a respective set of item IDs, and B) a second record structure in which each key comprises a different one of the item IDs and each value comprises a respective item of data. Said maintaining comprises adding each of a plurality of new item IDs to a group in the first record structure, wherein the new item IDs are added to a tree structure formed from records of the first record structure, the tree structure comprising a root record at a root level and a plural number of records at each of one or more successive levels. Each new item ID of the group is added in turn by, starting at the root level with the root record as a current record: I) determining whether the value of the current record will exceed the maximum size limit if the new item ID is included therein, and if not, including the new item ID in the value of the current record, but II) if so, identifying a number of records at the next successive level of the tree structure above the level of the current record, and applying a deterministic transformation to the item ID of the new item to determine one of the identified number of records, and repeating from I) with the determined record now as the current record. Over the group, at least one or some of the respective item IDs are added at least a first level above the root level via at least a first instance of II).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments of such may be put into effect, reference is made, by way of example only, to the accompanying drawings in which:

FIG. 3 is a schematic illustration of a first record structure for storing indexes,
FIG. 4 is a schematic illustration of second record structure for storing items of data,
FIG. 5(a) is a schematic illustration of a record in an index record structure,
FIG. 5(b) is a schematic illustration of a group of records in an index record structure.

DETAILED DESCRIPTION OF EMBODIMENTS

Figure 1:
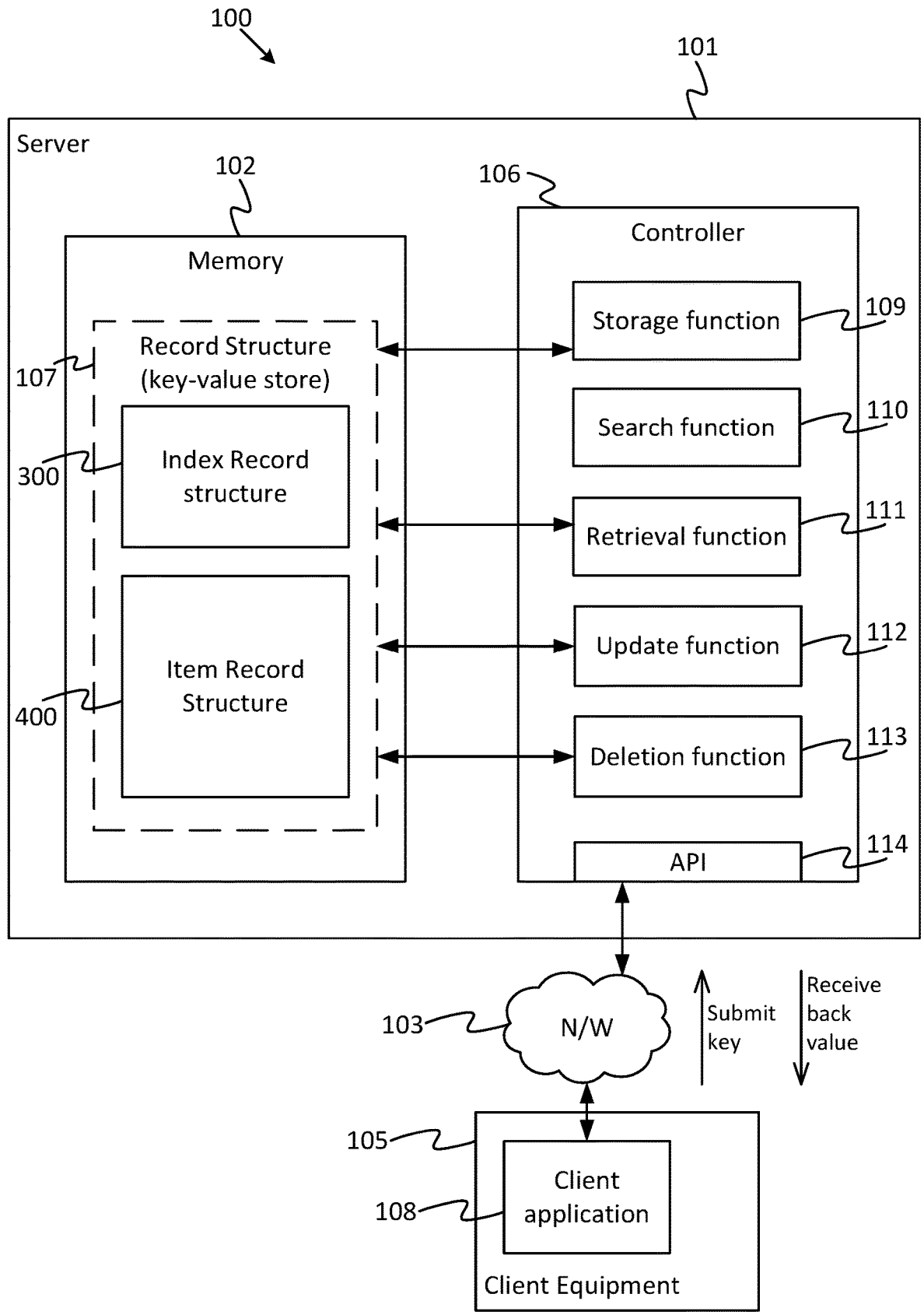
FIG. 1 is a schematic block diagram of a storage system.

FIG. 1 illustrates a storage system 100 in accordance with embodiments of the present disclosure. The system 100 comprises a server system 101 operated by a provider of a storage service, e.g. a cloud storage service provider. The provider could be an individual person, an organization such as a company, or a consortium of individuals and/or organizations. The server system 101 comprises one or more server units located at one or more sites or geographic locations. The server system 101 comprises memory 102 arranged to store a record structure 107 comprising a first constituent record structure 300 and a second constituent record structure 400. The first record structure 300 comprises a plurality of indexes which index items of data stored in the second record structure 400.

The memory 102 may comprise any one or more memory devices employing one or more storage media, e.g. one or more magnetic memory devices such as one or more magnetic hard disks and/or tape drives; one or more electronic storage devices such as one or more EEPROM(s), flash memories and/or solid state drives (SSD); one or more optical storage devices such as one or more optical disk drives and/or magneto-optical drives; and/or one or more biological storage devices such as one or more DNA storage devices.

The server system 101 is installed with a controller 106. The controller 106 takes the form of software stored on memory of the server system 101. This may be one or more of the same memory devices as the memory 102 on which the record structure 107 is stored, or a separate program memory, or a combination of these. In the case of a separate program memory, this may be implemented for example in one or more of any of the above-mentioned forms of memory device (e.g. magnetic memory, electronic memory, optical memory, etc.).

The controller 106 is arranged to run on one or more processors of the server system 101, e.g. one or more central processing units (CPUs), one or more graphics processing units (GPUs), one or more other accelerator processors or co-processors, one or more digital signal processors (DSPs), one or more application specific processors (ASICs), and/or one or more field programmable gate arrays (FPGA).

The controller 106 comprises a storage function 109, a search function 110, a retrieval function 111, an update function 112, a deletion function 113, and an application programming interface (API) 114, each implemented as a module of software. The API 114 is configured to enable an external client application 108 run on external client computer equipment 105 to connect to the controller 106 in order to request operations of adding, searching for, retrieving, updating and/or deleting a record to/from the record structure 107. The API 114 interfaces between the client application 108 and the storage function 109, search function 110, retrieval function 111, update function 112 and/or deletion function 113 respectively in order to handle the request.

The requesting client equipment 105 may comprise one or more computer units at one or more geographic sites. For example, the client equipment 105 may comprise a user terminal such as a desktop computer, laptop computer, tablet, smartphone, or wearable device such as a smartwatch or smart-glasses. Alternatively the client equipment 105 could comprise another server operated by a party other than the provider of the storage service. In another example the client application 108 could be implemented on the same server system 101 as the controller 106, but for illustrative purposes it may be described in the following as being implemented on a separate external client equipment 105 as shown by way of example in FIGS. 1 and 2. It will be appreciated that this is not limiting. Also, different requests for operations on different records, or for different operations on a given record, could originate from different client applications 108 on the same or different computer equipment 105. For illustrative purposes the following may be described in terms of requests originating from a given client application 108, but again it will be appreciated that this is not limiting.

The requesting client application 108 may connect to the API 114 via one or more networks 103, e.g. a wide area internetwork such as the Internet; another wide area network such as a mobile cellular network, satellite network or PSTN (public switched telephone network); a wireless local area network such as a Wi-Fi, Bluetooth, 6LoPAN, Thread, ZigBee, etc.; and/or a wired intranet such as an Ethernet network, Token Ring network or FDDI (fibre distributed data interface) network, etc.

The request for any of the operations of storing a new record, searching records, retrieving an existing record, updating an existing record or deleting a record in the record structure 107 may be requested by the client application 108 sending a corresponding request to the API 114 via the connection over the one or more networks 103. The client application 108 may comprise a user application, and any one or more of the requests could be initiated by a user 201 of the client application 108 via a user interface of the client application 108 presented through the respective client equipment 105. Alternatively or additionally, the client application 108 may comprise an automated application, and any one or more of the requests could be initiated autonomously from an automated function of the client application 108.

If the request is to store (add) a new record, the API 114 triggers the storage function 109 to perform a storage operation to add a new record to the record structure 107 based on the submitted request. If the request is to search for a record, the API 114 triggers the search function 110 to perform a search operation to search in the record structure 107 based on the submitted request. If the request is to retrieve an existing record, the API 114 triggers the retrieval function 111 to perform a retrieval operation to retrieve the record from the record structure 107 based on the submitted request. If the request is to update an existing record, the API 114 triggers the update function 112 to perform an update operation to update the record in the record structure 107 based on the submitted request. If the request is to delete an existing record, the API 114 triggers the deletion function 113 to perform a deletion operation to delete the record in the record structure 107 based on the submitted request.

Figure 2:
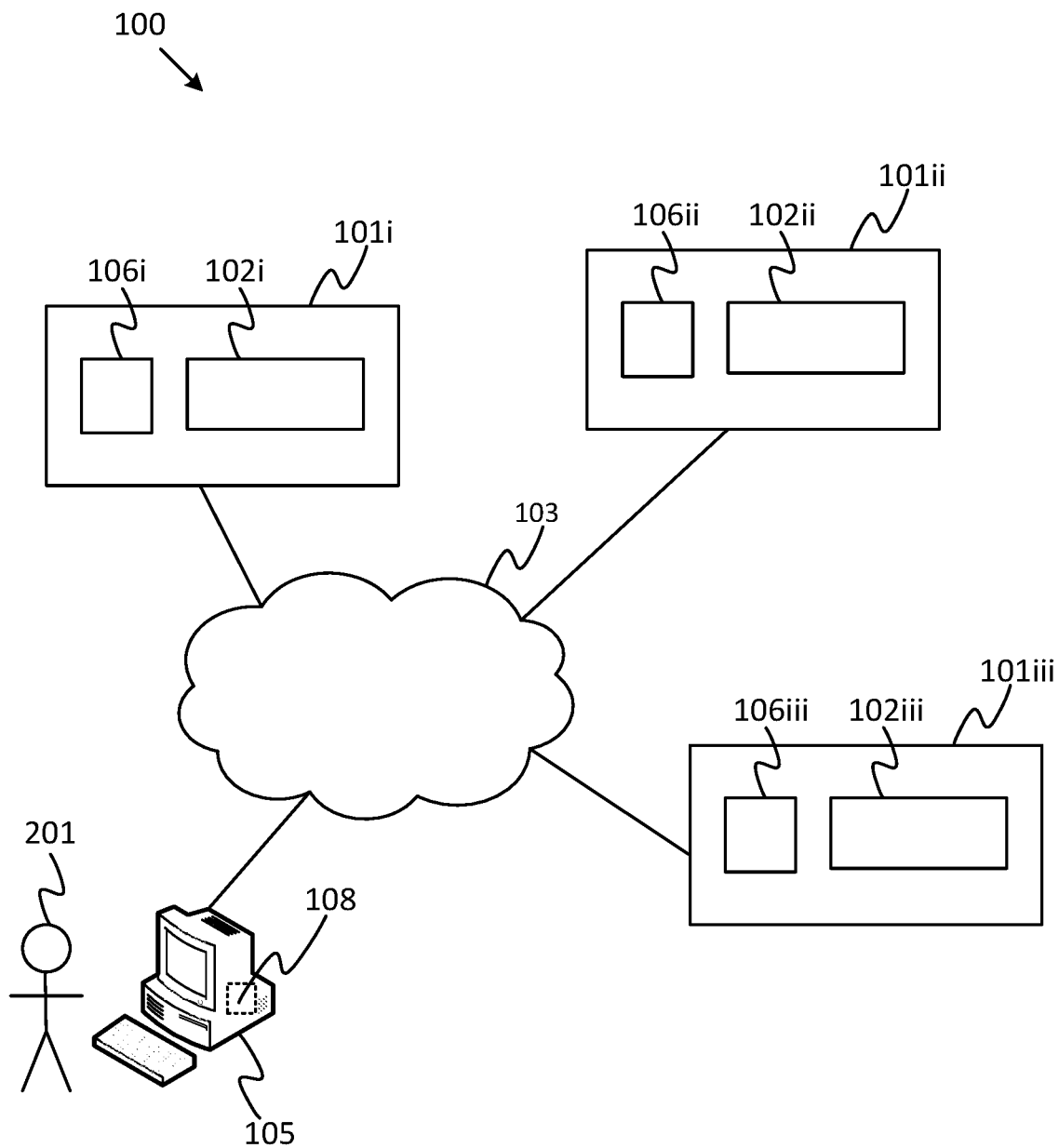
FIG. 2 is a schematic illustration of a storage system.

As illustrated in FIG. 2, in embodiments the server system 101 may be implemented in the form of a plurality of separate server units with the functionality of the controller 106, and/or the memory 102 storing the record structure 107, being distributed throughout the multiple server units. By way of illustration three server units 101*i*, 101*ii*, 101*iii* and their respective memories 102*i*, 102*ii*, 102*iii* and instances of the controller 106*i*, 106*ii*, 106*iii* are shown in FIG. 2, but it will be appreciated that other numbers may be employed. Each server unit 101*i-iii* comprises a separate memory 102*i-iii* respectively, and each is installed with an instance of the controller 106*i-iii*. The instances of the controller 106*i-iii* are configured to operate together to provide the overall functionality of the controller 106 using the distributed memory 102*i-iii* to provide an overall memory 102. The different controller instances 106*i-iii* could be identical instances or heterogeneous parts of the whole.

Each server unit 101*i*, 101*ii*, 101*iii* may for example be a distinct unit (separate casing) on a server rack, or being located in a different room or data centre. Some or all of the server units 101*i-iii* may even be located at different geographic locations, including the possibility of different towns, cities, counties, states, countries or even continents. Each server unit 101*i-iii* comprises a respective memory 102*i-iii* formed of one or more memory devices, which may comprise for example one or more magnetic memory devices such as one or more hard drives, one or more electronic memory devices such as one or more solid state drives (SSD), and/or one or more optical memory devices, or a combination of any such memory devices.

The server units 101*i-iii* are networked together via a suitable packet-switched network 103, which could be the same network or a different network to that via which the client application 108 connects to the API 114, or any combination of these. E.g. the server units 101*i-iii* may be networked together via a wide-area internetwork such as the Internet, or a private intranet, or a server area network, or any combination of two or more of these and/or any other type of network. The network(s) 103 may be implemented by any suitable wired and/or wireless communication medium or media, e.g. the wired infrastructure of the internet, and/or one or more wireless networks such as a wireless cellular network, wireless local area network(s), etc. By whatever means implemented, this enables the memories 102*i-iii* and controller instances 106*i-iii* on the different server units 101*i-iii* to act together as a combined memory 102 and overall controller 106 of a logical server 101, in order to provide a distributed storage system accessible to users 201 and/or automated functions from their respective equipment 105 via the network(s) 103. Where required, distributed storage and distributed computing technique are, in themselves, known in the art.

Note however that the possibility of a centralized controller 106 is not excluded. Nor is it excluded that the memory of only a single server unit may be used, or that the controller 106 and memory 102 could both be implemented together on a single server unit.

By way of an example application, the server system 100 may be arranged to provide storage services to at least one party (e.g. organization) being a customer or "tenant" of the provider of the storage service hosted on the server system 101. The server system 101 stores data resources which may comprise any digital information, e.g. files, stored communications, user profile information, or sites such as websites. Examples of files include word processing documents, spreadsheets, slide decks, images, videos, etc. Examples of stored communications include emails, or IM (instant messaging) chat histories. Examples of user profile information include contact details (e.g. "contact cards") and social media profiles. Examples of sites include document sharing sites, websites, and collaborative workspace sites.

The record structure 107 takes the form of a key-value store, in which each record takes the form of a key-value pair. I.e. each record comprises a respective key and a respective value mapped to that key. The retrieval function 111 enables the client application 108 to submit a request, via the API 114 and network(s) 103, wherein the request comprises the key of a requested record. In response, the retrieval function 111 looks up the value mapped to the submitted key and returns this value to the client application 108, again via the API 114 and network(s) 103.

Each value has a restricted size, i.e. a predetermined maximum limit to the quantity of data that can be stored in a given value. E.g. the key-value storage scheme could be DynamoDB, Oracle NoSQL, Cassandra, MemcacheDB, Couchbase Server, or a private scheme internal to the provider or a particular organization. For instance the size limit per value could be 400 KB, 512 KB, 1 MB, 15 MB, 20 MB or 2 GB or something of the order thereof.

As mentioned, the overall record structure (key-value store) 107 comprises a first constituent record structure 300 and a second constituent record structure 400.

FIG. 3 illustrates an example of the first record structure 300 in accordance with embodiments. The first record structure 300 comprises a plurality of first records 301, each comprising a respective key-value pair. I.e. each first record 301 comprises a respective key 302 and a respective value 303 mapped to that key. The first record structure 300 takes the form of an index structure. I.e. each key 302 comprises a different respective index, and each respective value 303 comprises a respective set of one or more entries storing a respective set of one or more item IDs indexed by the respective index. Each item ID references an individual corresponding item of data in the second record structure 400.

FIG. 4 illustrates an example of the second record structure 400 in accordance with embodiments. The second record structure 400 comprises a plurality of second records 401, each comprising a respective key-value pair. I.e. each second record 401 comprises a respective key 402 and a respective value 403 mapped to that key. The second record structure takes the form of an item record structure. I.e. each key 402 comprises a different respective one of the item IDs, and each value comprises a respective item of payload data.

Each item 403 may comprise a respective piece of content such: as a document (e.g. word processing document, spreadsheet, slide-show document, etc.); a media file (e.g. still image, audio clip, video, etc.); a site (e.g. website, document sharing site, etc.); a user profile of an individual user or group of users (e.g. a company intranet employee profile, social media profile, etc.); or a stored communication or communication history, which could be either a draft or a record of a past communication (e.g. a draft or recorded email, SMS, IM message, call, etc., or a chain thereof). Alternatively or additionally, each item 403 may comprise metadata of such a piece of content. E.g. the metadata could comprise a title of the content, a number of times the content has been accessed, a list of users associated with the content (e.g. who has modified it), a date last modified, a list of modification events, and/or a URL of the content, etc.

Via the API 114, the client application 108 can submit a retrieval request comprising the item ID 402 of one of the items 403 as the submitted key. In response retrieval function 111 will retrieve the corresponding item 403 from the second record structure 400 and return it to the client 108 via the API 114.

In the first record structure (the index structure) 300, each index 302 may specify one or more shared properties of the items identified by the respective set of item IDs 303. In this case, the respective set of IDs 303 comprises the item IDs 402 of a set of items 403 in the second index structure 400 that share the one or more properties. In embodiments the index 303 may take the form of a string. As an example, one of the indexes 302 may comprise a string such as "TenantA:SiteX:PopularInSite". This indexes all items of tenant A within site X that exceed a threshold degree of popularity within that site according to some predefined criterion (e.g. greater than a threshold number of views within a time period such as a day, week or month). Consequently, the respective set of IDs 303 mapped to that index would consist of the IDs 402 of all the items 403 of tenant A in the second record structure 400 that form part of site X and which meet the predetermined popularity criterion. As another example, one of the indexes 302 may comprise "ModifiedByDave". In this case, the respective set of IDs 303 would consist of the IDs 402 of all the items 403 of tenant A in the second record structure that have been modified by a particular user "Dave".

Via the API 114, the client application 108 can submit a retrieval request comprising the index 302 of a desired group of items as the submitted key. In response, the retrieval function 111 will retrieve the corresponding list of IDs 303 from the first record structure 300 and return it to the client 108 via the API 114. Optionally this could then be used at the client application 108 to select individual items within the group to request via a request to the second record structure 400, in the same manner as described previously. The selection could either be automated or performed manually by a user.

The above system works well until the number and/or size of the IDs in the value 303 of any one given record 301 in the index structure (first record structure) 300 grows beyond the maximum data limit of the key-value scheme being used (e.g. 400 KB in one example). It is recognized herein that this can become an issue for an index structure indexing a relatively large number of item IDs 303/402 per index 302. Sometimes this can even be an issue in systems where the value size limit is quite large (e.g. 2 GB). And/or, if the item IDs 402 themselves are large in size, this can also cause the same issue.

To address such issues or similar, the present disclosure provides an index structure 300 that comprises a multi-record tree structure for a particular group of item IDs within the index structure, and a deterministic formula for mapping item IDs to records within the tree structure. An example of this is illustrated first in FIGS. 5(a)-(b), and then in more detail in FIG. 6.

As shown in FIG. 5(a), in embodiments each index is extended to comprise a trunk portion and an enumerator. The trunk portion can take the same form as the index 302 would in the conventional case discussed previously in relation to FIG. 3, e.g. "TenantA:siteX:PopularInSite", or "ModifiedByDave". I.e. it specifies the one more shared properties of the items indexed by the group of item IDs, which are to be indexed together under the same tree structure and same trunk index portion. This could also be called the descriptor portion. The enumerator portion on the other hand may be a simple number or other such indicator distinguishing between the different records in the group. In the example shown, FIG. 5(a) shows the root record at the root level of the tree structure, and the corresponding enumerator is "0". The full index (key) of this record is the trunk (descriptor) concatenated with the enumerator (and optionally one or more separator elements such as ":"), giving for example "TenantA:siteX:PopularInSite:0".

When the storage function 109 adds a new item to the second record structure 400, it also adds the corresponding item ID 402 to the first and second record structures 300, 400. In the second (item) record structure 400 it is simply added as the key 402 of the respective record 401 in the second record structure 400. In the first (index) record structure 300, the item ID is added as one of one or more entries stored in the value 303 of one of the records in the tree structure. It is added to the value 303 of a record that is indexed under an appropriate trunk in the index 302, e.g. "TenantA:siteX:PopularInSite" if it is the ID of an item of tenant A in site X and that meets the popularity criterion, or "ModifiedByDave" if it is an item that has been modified by Dave, etc.

The storage function 109 may also sometimes add one or more new item IDs to a record 301 in the first (index) structure 300 even when a new item is not being added to the second (item) record structure 400. For instance, if an existing item of tenant A in the item record structure 400, that was not previously popular, subsequently exceeds the popularity threshold for site X, then its ID will at that point be added to the index structure 300 under "TenantA:siteX:PopularInSite". Or if Dave newly modifies an existing item in the item record structure 400, its ID will be added to the index structure 300 under "ModifiedByDave".

Note also: a given item ID could be added under more than one index (e.g. if it was both popular in site X of tenant A and modified by Dave). Also, the first (index) record structure 300 may comprise more than one tree structure, each for a different group of items IDs (e.g. one for the IDs of the items described by index trunk "TenantA:siteX:PopularInSite" and one for the IDs of the items described by index trunk "ModifiedByDave"). For illustrative purposes the following will be described from the perspective of a given tree structure for a given group of item IDs, but it will be appreciated that the same techniques can be used to create other tree structures for other groups.

At first, the storage function 109 will begin by trying to add the new item IDs to the value 303 of the root record. However, when this becomes full (such that the next item ID to be added would exceed the size limit of the value 303), then it will need to start creating additional records in the index record structure 300. This is shown in FIG. 5(b). The additional records have the same the same trunk index (e.g. "TenantA:siteX:PopularInSite") as the root, but a different enumerator, for instance "TenantA:siteX:PopularInSite:1", "TenantA:siteX:PopularInSite:2", etc. in the example shown.

Figure 6:
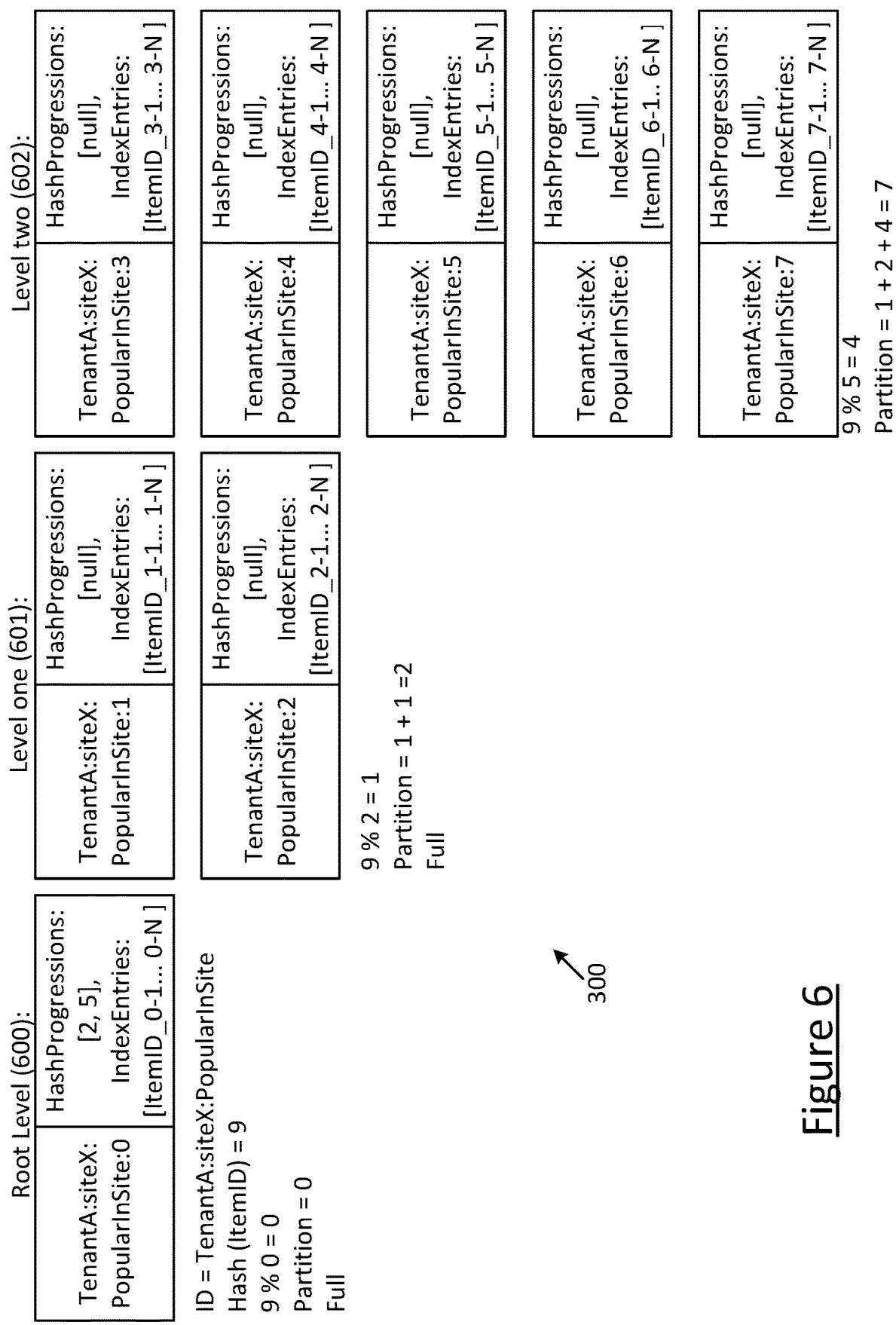
FIG. 6 is a schematic illustration of a tree-based record structure for indexes.

FIG. 6 illustrates how the storage function 109 creates these additional records in a tree structure relative to the root record. The different records within a given tree structure may also be referred to herein as "partitions" of the tree. "Nodes" is another common term used for describing parts of such trees.

The tree structure comprises a root level 600 comprising a single root record, and a one or more successive levels above the root level. Two levels 601, 602 above the root are shown in FIG. 6 for illustrative purposes, but this is not limiting. At each level 601, 602 above the root level 600, the respective level comprises a plurality of records. E.g. in the example shown the first level 601 above the root comprises two records (partitions), and the second level 602 above the root has five records. However these particular numbers are not limiting. In general there could be the same or different plural numbers of records (partitions) at different levels above the root level 600. The records above the root could be added dynamically as-and-when needed when adding new item IDs, or could be part of a predetermined data structure formed in advance of adding any item IDs that will populate those records. Similarly, the number of records (partitions) at each level could be determined dynamically as the tree is grown, or could be predetermined.

To populate the tree structure, the storage function 109 operates as follows. When it has a new item ID to add, the storage function 109 works its way up the tree structure starting from the root, trying to find a record (partition) that has space for the new item ID. It explores one record per level, then if it does not find space there, moves up to the next level of the tree, and so forth.

Starting with the root record in the root level 600, the storage function 109 determines whether there is enough space in the respective value 303 of the current record under consideration to store the new item ID without exceeding the value size limit. If there is enough space, it simply stores the new ID in the value of the current record. If however there is not enough space in the current record under consideration, then the storage function 109 determines which of the plural number of records (partitions) at the next successive level to explore next. It does this by applying a deterministic transformation to the new item ID that it is currently trying to add. The transformation outputs the enumerator of the record to explore next. So if the search function 109 is currently exploring a record at level L, and the transformation is denoted f, then the enumerator of the next record to explore at level L+1 is given by f(ItemID), where ItemID is the ID of the item currently being added.

In embodiments, preferably f is a function that has a uniform output distribution, e.g. a function comprising a hash function. This has the advantage that it will tend, on average, to spread the item IDs evenly over the records at a given level L+1. In embodiments f may be defined as follows.

$$f = [(\text{hash}(\text{ItemID}) \% \text{ number of records at level } L+1)] + \text{number of records at current level } L + \text{number of records in any lower levels below } L,$$

where "hash" is a hash function that hashes to an unsigned integer, and "%" denotes a modulo (i.e. wrap-around) operation. So what this says is, take the hash of the item ID that is currently being added, in order to thereby give an unsigned integer; and then determine what this unsigned integer is modulo the number of records at the next level L+1. That number is then added to the total number of records at the present level L and below, to give the enumerator of the record to try next at level L+1.

So referring to the example of FIG. 6, say the root record is found to be full. The storage function 109 then computes the hash of the new item ID currently under consideration, which in the example, say, gives the result 9. It also identifies that there are 2 records (partitions) at the next level 601. The storage function then computes 9 mod 2 (9% 2), which equals 1. The number of records at the preceding, root level is also 1. This means the enumerator of the record to explore next at level 601 is 1+1=2. The storage function therefore goes on to explore the record with index "TenantA:siteX:PopularInSite:2" at level 601.

If this has enough space to store the new item ID, the storage function 109 stores the new item ID in this record. However, if not, the storage function 109 goes on to explore a record at the next level 602. To determine which record, it again uses the hash of the item ID currently being added, which is 9 in this example. It identifies that there are 5 records (partitions) at the next level 602, and computes 9% 5, which is 4. The total number of records (partitions) at the current and preceding level is equal to 1 (at the root level)+2 (at the current level)=3. Therefore the enumerator of the record to explore next at level 602 is 1+2+4=7. The storage function 109 therefore goes on to explore the record with index "TenantA:siteX:PopularInSite:7" at level 602.

If this record has enough space to store the new item ID, the storage function 109 stores the new item ID in this record. However, if not, the storage function 109 continues up the tree according to the same formula until it finds a record that has space for the new item ID.

Note that the transformation f, used to output the enumerator of the next record to explore, does not necessarily have to take the particular form exemplified above based on the hash and modulo. This may be preferred in order to give a uniform distribution. However, other functions having a uniform output distribution could be used. Further, it is not essential to have a uniform output distribution. E.g. as another, less preferred example, f could divide item IDs into bins based on the first digit or character of the ID, and distribute different bins of IDs into different records. If the average distribution of first digits or characters is known, the size of the bins could be weighted to give a uniform distribution.

In embodiments, the number of records (partitions) at each level of the tree structure may be stored in the value 303 of one or more records at one or more preceding levels. For instance, in embodiments, the number of records at each level is stored in an array in the value of the root record. This is shown in FIG. 6, labelled "hash progressions". When performing the above calculation to determine the next record to explore, the storage function 109 will identify the number of records at the next level by reading the number from the value of one of the records at the current or a preceding level, e.g. the root record.

Once at least some item IDs have been added to the tree structure, a number of further operations may then be performed by the search function 110, retrieval function 111, update function 112 and/or deletion function 113.

The search function 110 can search to determine whether a given, target item ID is found within the group of IDs in a given tree structure. This may be done based on the same transformation f as used by the storage function 109 when adding a new item ID. This may be performed in response to a search request message submitted from the client application 108, via the API 114, which includes the target item ID in the request. In response the search function 110 works its way up the tree in a similar fashion to the storage function when adding a new item ID, but now searching for a record that contains the target item ID (rather than seeking a record that has space for the new item ID as in the storage case).

So starting with the root record, the search function 110 determines whether the target ID is found in the current record. If so the search ends there. If not however, the search function 110 determines which record (partition) at the next level (e.g. 601) to explore next. It does this by applying the transformation f to the target ID, which outputs the enumerator of the next record to explore. If the target ID is found there, the search ends, but if not the search function 110 applies the same formula again to determine which record to explore at the next level (e.g. 602), and so forth. So if searching for the item ID that hashes to 9, as was described as being added in the example of FIG. 6, the search would progress in exactly the same sequence (root, then partition 2, then partition 7, etc.) based on the target ID submitted in the search request.

Retrieval function 111 can retrieve the list of all item IDs in the tree (i.e. the group) based on the trunk portion of the index (i.e. the descriptor), e.g. "TenantA:siteX:PopularInSite" in the example shown. This may be performed in response to a retrieval request message submitted from the client application 108, via the API 114, which includes the trunk portion of the index in the request message. This does not need to include the enumerator. In response, the retrieval function 111 retrieves from the index structure 300 all the item IDs mapped to the submitted index trunk (i.e. all those in the same tree), and returns these in a list via the API 114 to the client application 108.

In embodiments, the response to the retrieval request might be quite long (containing a list of many item IDs), and therefore may be returned to the client application 108 spread across a sequence of more than one response message. In this case each message comprises a different respective continuation token to keep track of which response is which in the sequence.

In some embodiments, the record structure 107 may employ a scheme of reverse indexes in order to assist with operations such as update and deletion of existing item IDs in the index structure 300. This is illustrated by way of example in FIG. 7.

Figure 7:
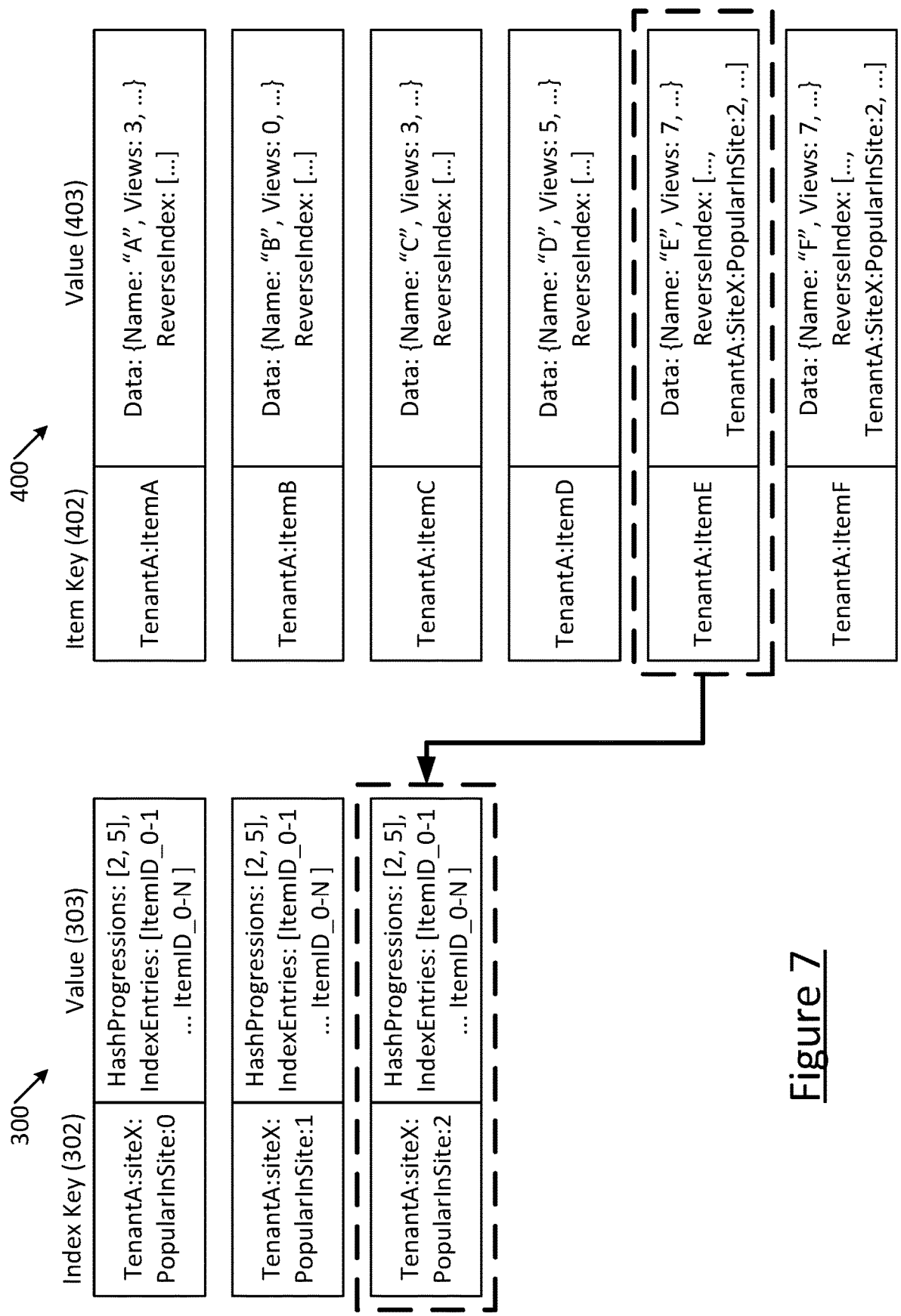
FIG. 7 is a schematic illustration of a reverse look-up method.

As shown in FIG. 7, when a new item ID is added to one of the records 301 in the first (index) record structure 300 (or afterwards), then in embodiments the storage function 109 may also store the index 302 of that record 301 in the value 403 of the record 401 storing the respective item in the second (item) record structure 400. This allows for reverse look up. So say the deletion function 113 is later going to delete a given target ID from the index structure 300. This could be required, for example, based on a deletion request message from the client 108 specifying the target ID, and/or because the respective item is detected as no longer meeting the criterion for inclusion under a given index trunk (e.g. it is no longer popular in site X). Similarly, an update operation may comprise deleting an item ID from a record 301 in the index structure 300 and overwriting with another item ID.

As discussed, the system uses a key/value store. Any request to this underlying storage is made using a key, and in response a value is returned. The combination of a key and value is called a record. In embodiments this is the only storage mechanism used in the system 100. Any other concepts such as indexes, index entries, item IDs and items are higher-level logical constructs built on top of the key-value store. So, at the physical level the system is built on records, where each record consists of one key and one value.

This record can represent either an item or an index or (with the disclosed scheme) part of an index. When it is an item, the key is the ID of the item. The value contains all data for that item (either the content of the item itself or a set of metadata describing the item). When it is an index, the key is some constructed thing using some aspects of the index (the trunk part discussed previously). The value contains data for that index, which is a set of item IDs.

The API 114 in may perform operations based on requests from the client 108 such as:
  InsertItem(ItemId, ValuesForItem)
  DeleteItem(ItemId)
  UpdateItem(ItemId, NewValuesForItem)
  String GetItem(ItemId).

Each of those would be transformed by the functions 109, 110, 111, 112 into to calls to the record structure 107 such as:
  Upsert(key,value)
  Delete(Key)
  String GetValue(key).

The process of hashing of IDs, etc., happens inside the controller 106, and may be hidden from the client 108.

The mapping from the InsertItem operation in the API 114 to the call the storage function 109 makes to the item record structure 400 may operate as follows. When receiving the InsertItem(ItemID, ValuesForItem) call, it will make a call towards the record structure 107 with Upsert(key,value), where key=ItemID and value=ValuesForItem. So, while the API 114 between the client 108 and the server 101 talks about ItemIDs, the communication between controller 106 and record structure 107 is purely about keys and values (where the key may have the value of an ItemID, or something else).

What happens inside the controller 106 for indexes in the index structure 300 may operate as follows. The client 108 will have operations sent to API 114 such as: List<ItemIDs>GetRelationships(ItemID, relationshipType). This method returns a set of ItemIDs, which are related to the ItemID through a relationship of type RelationshipType. For example, the call could be GetRelationships("Dave", "ModifiedBy") and it would return a list of the IDs of items (e.g. files) that Dave recently modified, e.g. in the form of FileID1, FileID2 etc. In order to figure out this, the retrieval function 110 would make a call to the database GetValue (key="ModifiedByDave-0"). The value returned would contain a list of ItemIDs, such as File1, File2 etc. With embodiments of the presently disclosed techniques, it may also include the HashProgression.

Where reference is made herein to an index entry ("IndexEntry"), this means the entry of one item ID listed in the value 303 of an index 302. Thus, the ID of File3 would be an index entry in the above example or in FIG. 5(a), for instance.

FIG. 5(b) takes this example further to one where HashProgression is not null, because all IndexEntries could not fit in the value of one record. Here, the first key ("TenantA: siteX:PopularInSite:0") contains a set of IndexEntries, i.e. the IDs of items that are trending in that site. Since the HashProgressions is 2, the controller knows that it also needs to look up the next two keys, "TenantA:siteX:PopularInSite:1" and "TenantA:siteX:PopularInSite:2". As can be seen in the figure, those contain further IDs of further items that are trending in this site. However, the indexEntries in those value have been stored according to a pattern, using hashes. The ItemID of the IndexEntry has been hashed to determine if they should go into "TenantA:siteX:PopularInSite:1" or "TenantA:siteX:PopularInSite:2". Because of this the even numbers ended up in . . . 1 and the odd ones ended up in . . . 2. (This is just an example to illustrate the principle, and with a larger hash number the actual numbers would be different).

Key-value stores are commonly used as flexible storage solutions that can scale in size with increasing load while still maintaining good read/write performance. Many types of data access patterns can be supported by building the necessary data structures "on top of" key-value stores, i.e. by storing necessary metadata in the values under deterministically generated keys. One example of access patterns that can be supported via key-value stores is that of index lookups; one or more keys is queried in order to retrieve the information necessary to locate a set of data items, potentially stored in the same key-value store. The present disclosure provides a mechanism for maintaining very large indexes on top of key-value stores, circumventing the issue of maximum value size and maintaining high read/write throughput to the index structures.

Key-value stores provide a flexible means for storage and retrieval of potentially large data sets. Furthermore, due to their construction they are typically capable of maintaining high read/write throughput with increasing number of key-value pairs. However, in order to achieve these desirable properties, key-value stores (such as distributed key-value stores) often enforce somewhat strict restrictions on the size of each value. The table below shows size limits enforced by some commonly used key-value systems.

| Key-value store system: | Maximum size of value: |
| --- | --- |
| DynamoDB | 400 KB |
| Oracle NoSQL | 512 KB |
| Cassandra | 1 MB recommended (2 GB maximum) |
| MemcacheDB | 1 MB |
| Couchbase server | 20 MB |

Some examples exist of systems that support very large values (e.g Cassandra), but values of these sizes introduce problems of their own, e.g. I/O resource limits, cost of search within a single value, and loss of parallelism.

Some scenarios and user experiences necessitate large index structures that exceed the maximum size of a single value in the underlying key-value store. One example of such a scenario is listing all the sites in the intranet of a tenant (customer of a cloud service). Another example is an index over all shared documents within a tenancy, and a third example is an index containing all files in a document library of a given type, e.g. docx. The present disclosure covers mechanisms for implementing large index structures that span multiple key-value pairs (also referred to as records), thus circumventing the size limits of the individual values of each key-value pair. In embodiments, the disclosed scheme supports indexes of arbitrary size while maintaining O(1) (i.e. order 1) complexity for deletions and insertions, while index lookups and insertions have a complexity of O(h), where h corresponds to the number of levels in a search tree. To further improve performance, write-compaction is utilized to ensure that the top levels of the search tree are as full as possible.

In embodiments the disclosed scheme allows the index data structures to grow on demand, and unless the size of the index structures exceed what can be kept in a single record, no performance penalty is incurred. By leveraging various strategies, different performance characteristics and traversal semantics can be supported while enumerating the index structures.

The disclosed embodiments may provide any one or more of the following.
- A set of efficient index structures built on top of a key-value store, that can support indexes of arbitrary size, stored as a tree structure across multiple key-value pairs.
- A mechanism for supporting O(1) updates of entries in a key-value store based index.
- A mechanism for supporting O(1) deletions of entries in a key-value store based index.
- A mechanism for providing search for a given index entry with O(h) complexity, where h corresponds to the number of levels of a search tree.
- A mechanism for providing additions of new index entries with O(h) complexity, where h corresponds to the number of levels of a search tree.
- Leveraging a write-compaction technique to reduce the average number of key-value pairs that must be read on average during search and additions.
- Using continuation tokens to facilitate complete enumeration of indexes when the number of items to be returned exceeds what can be returned in a given query towards the index.

Due to their desirable scalability and performance characteristics, key-value stores are frequently used to store data in cloud scale systems. The simple abstractions provided by such storage systems can be leveraged to build more complex constructs, e.g. indexes for serving various data in support of complex user experiences and data analytics scenarios. The present disclosure describes an index solution based around two types of record: index records 301 and item records 401. In embodiments only these two types of record are used. Key-value stores are not usually implemented using tables, but these distinct data types would correspond to an index- and data table in a relational database setting. Conceptually, each item 403 can be retrieved by looking up a single value via its corresponding key 402 (i.e. an item 403 maps to a single key-value pair 401). Some examples of items are documents, news, or groups belonging to an organization.

Furthermore, an index record 301 contains system metadata describing an index over one or more items. The value 303 of each index record 301 can be retrieved from the key-value store by looking up a single distinct key 302. One can envision multiple types of indexes, e.g. an index from a site to popular documents within that site, an index from a site to the news published within that site, or an index from a user to all the documents that have been modified by that specific user.

Since the previously mentioned index values 303 often are relatively small, they can usually be stored in a single index record 301 (both with regards to size and performance). However, some scenarios necessitate large index values 303 that cannot easily be fit into a single index record 301. Since some tenants are very large (hundreds of thousands of users), it would for example be undesirable (and for some key-value stores impossible) to represent the IDs of all shared documents within a tenancy in the value 303 of a single index record 301. This present disclosure describes a set of mechanisms for building indexes of arbitrary size over items stored in a key-value store. Rather than using a single index record 301, multiple index records 301 are used to build a single large index structure over many items. The following paragraphs will describe an example implementation of these mechanisms in more detail.

As mentioned above, it is possible to have many different types of indexes. Since it preferably should be simple to generate and look up the indexes, one possible schema for the index record keys 302 could be as follows:[TenantId][SourceEntityId][IndexType], where the TenantId uniquely identifies the tenant for which the index has been built, the SourceEntityId corresponds to the entity to which items are related, and the IndexType describes the type of index/relationship from the source to the items. For the first example given above, the SourceEntityId would uniquely identify a site, while the IndexType would be "PopularInSite". In order to support arbitrary large indexes, the above key schema will be further augmented with a PartitionId field. The final key schema for index records thus looks like this: [TenantId][SourceEntityId][IndexType][PartitionId].

Initially, all the IDs indexed by a given index span only a single index value 303, and thus only a single record 301. However, when the size exceeds that of a single record, the overall index is grown by adding additional index records 301. This situation is illustrated in FIG. 5. Since additional index records only are added on demand, small index values are not at all impacted by the multi record design. Specifically, no performance penalty is incurred by the design unless the value size necessitates the use of multiple index records.

When the index value size exceeds the capacity of a single record 301, additional records 301 are introduced to increase the available capacity. The multi-record index structure for a given index trunk (e.g. "TenantA:SiteX:PopularInSite") is structured as a tree, where partition 0 corresponds to the root of the tree. Whenever a record of a level in the tree is full, a new level is added to the tree (since records are distributed to the records within a single level with a substantially uniform distribution, this will not lead to uneven utilization of records in the common case). In FIG. 5b), partitions 1 and 2 correspond to the second level of tree (first above the root) consisting of the root plus two additional records. The number of new partitions added at each level of the tree is pre-configured. The number of records currently in use in the multi-record index can be determined by reading the contents of the hash progression in partition 0 of the index. The number of records in the tree structure is given by Equation 1:

$$N_{records} = 1 + \Sigma_{i=1}^{N} Progression_i \quad (1)$$

That is, 1 plus the sum of the hash progression values. "Hash progression" is another term used herein for the number of records at a given level above the root.

In FIG. 6 for example, the hash progression list present in partition 0 contains 2 and 5. This yields a total of 1+2+5=8 partitions/records spread over three levels in the tree.

FIG. 6 also shows how the correct record for a given key can be located by the storage function 109 in the case of a large multi-record index tree. First, the unique identifier of the item being pointed to is hashed to obtain an unsigned integer. Assuming that the result of this hashing operation is 9, a modulo operation is used with the first (empty) hash progression and get back partition 0 (in practice, since all numbers modulated with 1 return zero, this first step can be replaced with checking whether free capacity exists in the first record). In this example, partition 0 is full and it is necessary to proceed to the next level of the tree. Since the number of records in this level of the tree is 2, 9 is modulated with 2 which yields the result 1. Partition number 1+1 is checked for capacity, but it is full so again it is necessary to continue to the next level of the tree. This level contains 5 records; 9% 5 yields 4, so partition 1+2+4=7 is checked to see whether enough capacity exists. In this example, it does and the index entry is inserted in partition 7 under the key [TenantA:SiteX:PopularInSite:7]. Had there not been enough capacity available, a new level would have been added to the tree before the index entry could be stored. In general, the enumerator of the partition to evaluate for capacity is given by Equation 2:

$$PartitionId = \begin{cases} 0, \text{ if available capacity in root record} \\ \sum_{l=1}^{N} NumRecords_{l-1} + Id \ \% \ NumRecords_l, \text{ otherwise} \end{cases} \quad (2)$$

where l is the current level in the tree, and $NumRecord_{sl}$ is the number of records in use at level l of the tree.

As seen by the above example, multi-record index trees can induce some additional cost when adding a new index entry. The complexity of adding a new index entry ID is O(h), where h is the number of levels in the tree. When searching the index for a specific index entry, the complexity is also O(h), where h is the number of levels in the tree, as the same basic operations as for additions must be performed (in embodiments there is an optimization that reduces the expected complexity in a common case, discussed shortly).

However, by introducing a reverse index mapping on the data items, the complexity for delete and update operations on an entry can be kept constant time (O(1)). In this case, when an entry (item ID) is inserted into an index record 301, the key 302 of that index record is stored in the item record 401. This means that at update/deletion time-before overwriting (update) or removing (delete) the item ID in/from the index record structure 300, this reverse index mapping can be consulted to determine which index record(s) 301 should be updated. Since the exact key is known there is no need to evaluate multiple records in order to locate the index entry that should be updated/deleted. Instead, a single lookup towards the key-value store suffices. FIG. 7 illustrates how a reverse index mapping on an item can be used to locate the correct index record in constant time.

Although the complexity for additions and searches in a large multi-record index is O(h), where h is the number of levels in the tree, write compaction is utilized to keep the average number of records that must be interrogated as low as possible. Whenever an item is deleted, the slot previously occupied by that index entry is left empty. When a new item is added to the index, the first record with free space is utilized. In combination, these rules result in the upper levels of the tree being as full as possible, in turn reducing the average number of records that must be evaluated.

It is not common for key-value stores to support transactions across multiple key-value pairs. This makes it costly to implement schemes where each partition corresponds to a given range of the index value (it is possible to implement transactions on the application level using e.g. locks or optimistic concurrency control). Some key-value stores (such as used in embodiments herein) offer optimistic concurrency control primitives such as compare-and-swap (CAS) at the level of a single key-value pair. Using CAS, it is simple to keep each index record sorted internally without reducing performance considerably. If an index is to be kept sorted on time, it is thus possible to keep each index record sorted on a timestamp, but non-trivial to keep ordering across records.

Since the total set of entries for a given tree can be of arbitrary size, the data returned from querying the index trunk can be too large for processing in a single request/response. As such, a mechanism for enumerating the index via multiple requests/responses may be employed. To facilitate enumeration of large index trees, embodiments leverage a continuation token as part of the index query API 114. This continuation token contains information about how far the enumeration of the index has progressed, what enumeration strategy is used, and whether the index has been exhausted. Example enumeration strategies are:
  a) unordered—the order in which the indexed items are returned does not matter, as long as all items are returned; or
  b) ordered—the ordering of the returned items does matter, and ordering across records must be ensured.

Dependent on which enumeration strategy is used, the continuation token will contain the necessary state. In the case of unordered enumeration, the records can be enumerated one at a time, and the necessary information amounts to:
  (i) the record currently being enumerated,
  (ii) the sort-key of the latest enumerated index entry, and
  (iii) whether or not the index has been exhausted.

If an ordered enumeration is ongoing, the information might be slightly different. If, for example, an N-way merge is used to implement the ordered enumeration, it would be necessary to keep the sort-key corresponding to the last returned position in each index record, and whether any of the index records and/or the index as a whole has been exhausted.

By evaluating the continuation token, a caller can determine whether another call should be made in order to retrieve more entries. The continuation token returned from the previous call would then be passed as an argument to the successive call. An example query API leveraging a continuation token might look as follows: QueryResponse ExecuteQuery(Id sourceId, IndexType idxType, int nItems, string queryFilters, ContinuationToken token)

When querying an index trunk (e.g. "TenantA:SiteX: PopularInSite"), it is common for the caller to specify how many entries (item IDs) should be returned. Dependent on the enumeration strategy, it is possible to limit the number of keys that must be read by first reading a minimum amount of index records, before then resolving entries. Dependent on how entries are resolved, it may sometimes be necessary to continue reading more index records in order to resolve the desired number of entries. For example, consider the following situation: a caller queries the index trunk for 100 entries (unordered). Each index record contains 75 entries, which means that initially the two first index records are queried (it is possible to use techniques such as heuristics or learnt statistical models to calculate the expected number of keys that must be read, thus reducing the number of necessary "rounds"). Furthermore, the second level of the tree has recently been added, so while record 0 is full and contains 75 entries, record 1 contains only 20 entries. After resolving all the entries, it would then be necessary to read index record 2 in order to get more index records from which to resolve entries. Dependent on the how many index entries are present in record 2, it might be necessary to continue reading more index records until either a) the desired number of entries has been resolved, or b) the index record has been exhausted.

Yet another situation might occur that might necessitate consecutive rounds of index record reads and resolution of entries. Consider a situation where the index query contains a filter over items. One example of such a filter would be that of ensuring a user has access to the item. Another could be to only return IDs of items that have been modified in the last N days. As in the previous example, the index record is queried for 100 item IDs (entries), and each index record contains a maximum of 75 item IDs. In this case, the index value is very big and the first 3 index records are completely full. At the first iteration, the index records 0 and 1 are returned. This yields a candidate set of 150 item IDs, but due to the query filter only 85 are returned. As before, it is necessary to do another iteration; reading the next index record before attempting to resolve more entries. Again, this process might have to be repeated multiple times until either a) the index has been exhausted, or b) the desired number of entries has been resolved.

The followings now give step-by-step descriptions of how operations toward the index structure 300 are performed.

Updating the index entry for an existing item in the index (update function 112):
1) The existing item value 403 is read from the item key-value store 400.
2) The reverse index mapping of the item is read. For each key, $key_{idx}$, in the reverse index mapping:
   a. The index record, $Rec_{old}$, is read from the index key-value store 300
   b. A new index record, $Rec_{new}$ is created by
      i. The old index entry is deleted from the record
      ii. The new index entry is inserted into the record (at the correct position)
   c. $Rec_{new}$ is written to the key-value store under $key_{idx}$ 3) The new item is written to the key-value store.

Deleting an item (deletion function 113):
1) The existing item value 403 is read from the item key-value store 400.
2) The reverse index mapping of the item is read. For each key, $key_{idx}$, in the reverse index mapping:
   a. The index record, $Rec_{old}$, is read from the index key-value store 300
   b. A new index record, $Rec_{new}$ is created by
      i. The old index entry is deleted from the record
   c. $Rec_{new}$ is written to the key-value store under $key_{idx}$
3) The item is deleted from the key-value store.

Search for a given item within an index (search function 110):
1) The Id for the item to be searched for is generated is hashed to an unsigned integer.
2) Record 0 of the index is read from the index key-value store 300
   a. It is checked whether the index entry for the item is contained in the index record, e.g. using binary search.
      i. If the index entry is contained, the search is complete and the index entry is returned.
      ii. If the index entry is not contained, the search continues by
   b. The hash progression list of index record 0 is consulted.
      i. If no more progressions exist, the index has been exhausted and the search is over.
      ii. If more hash progressions exist, the current index partition is determined according to Equation 2.
      iii. The index record corresponding to the partition determined in the previous step is read and checked.
         1. If the index entry is contained, the search is complete and the index entry is returned.
         2. If the index entry is not contained, execution continues by looking up the next hash progression (step 2b).

Addition of an item (storage function 109):
1) The Id for the item to be searched for is generated is hashed to an unsigned integer.
2) Record 0 of the index is read from the index key-value store 300
   a. If there is sufficient capacity for the index entry in the index record, the entry is added to the index record and it is written back to the key-value store.
   b. If there is insufficient capacity for the index entry, the hash progression list of index record 0 is consulted.
      i. If no more progressions exist, a new level is added to the tree by adding a new entry to the hash progression list.
      ii. If there exists more hash progressions, the current index partition is determined according to Equation 2.
      iii. The index record corresponding to the partition determined in the previous step is checked to see whether sufficient capacity is available.
         1. If enough capacity is available, the index entry is added to the record and it is written back to the key-value store.
         2. If there is not enough capacity available, execution continues with step 2b.

Unordered retrieval of N items (retrieval function 111):
1) The calling client 108 issues a query with an empty continuation token, indicating that N item IDs should be retrieved in an unordered fashion.

2) Upon receipt of the request, record 0 of the tree structure is read.
   a. A list of results is initialized
   b. For each of the index entries, any query filters are applied:
      i. If the item match the filters, the item ID is added to the result set.
      ii. If the item does not match, the item ID is discarded.
      iii. The continuation token is updated, encoding the current state.
      iv. If the list of results has reached length N, the item IDs are returned to the caller.
   c. If the result list has not reached length N, the hash progression list of index record 0 is consulted.
      i. If no more hash progressions exist, the tree has been exhausted and the item IDs resolved thus far are returned.
      ii. If more hash progressions exist, the next record is read, and execution continues with step 2b.

Unordered retrieval of all items under an index trunk (retrieval function 111):
1) The calling client issues a query with an empty continuation token, indicating that N item IDs should be retrieved in an unordered fashion.
2) When the response from the index query is received, the continuation token is evaluated to check whether the tree has been exhausted.
   a. If the tree has been exhausted, all item IDs have been returned
   b. If the tree has not been exhausted, another query for more item IDs is issued to the tree, passing the continuation token from the previous response as argument. The enumeration of the index then continues from step 2).

Ordered retrieval of N items (retrieval function 111), assuming N-way merge is used to provide ordered results.
1) The calling client 108 issues a query with an empty continuation token, indicating that N item IDs should be retrieved in an ordered fashion.
2) Upon receipt of the request, record 0 of the tree is read.
   a. A list of results is initialized
   b. The hash progression list is consulted, and the total set of index records is queried.
   c. The index entries in each index record are sorted according to the sort-key given by the query.
   d. Using N-way merge, the next item ID is picked from the head of one of the records:
      i. If the item match the filters, the item ID is added to the result set.
      ii. If the item does not match, the item ID is discarded.
      iii. The continuation token is updated, encoding the current state.
      iv. If the list of results has reached length N, the item IDs are returned to the caller.
   e. If the all records has been exhausted, the continuation token is updated encoding the current state.
      i. The item IDs resolved thus far are returned to the caller along with the continuation token, Ordered retrieval of all items under an index trunk (retrieval function 111):
1) The calling client 108 issues a query with an empty continuation token, indicating that N item IDs should be retrieved in an ordered fashion.
2) When the response from the index query is received, the continuation token is evaluated to check whether the tree has been exhausted.
   a. If the tree has been exhausted, all item IDs have been returned
   b. If the tree has not been exhausted, another query for more item IDs is issued to the tree, passing the continuation token from the previous response as argument. The enumeration of the index then continues from step 2).

It will be appreciated that the above embodiments have been described by way of example only.

More generally, according to one aspect disclosed herein, there is provided computer-implemented method comprising: maintaining a key-value store comprising multiple records, wherein each record comprises a respective key and a respective value mapped to the respective key, wherein each value is restricted to a maximum size limit in terms of quantity of data; wherein the key-value store comprises A) a first record structure in which each key comprises a different index and each value comprises a respective set of item IDs, and B) a second record structure in which each key comprises a different one of the item IDs and each value comprises a respective item of data; wherein said maintaining comprises adding each of a plurality of new item IDs to a group in the first record structure; wherein the new item IDs are added to a tree structure formed from records of the first record structure, comprising a root record at a root level and a plural number of records at each of one or more successive levels; and wherein each new item ID of the group is added in turn by, starting at the root level with the root record as a current record: I) determining whether the value of the current record will exceed the maximum size limit if the new item ID is included therein, and if not, including the new item ID in the value of the current record, but II) if so, identifying a number of records at the next successive level of the tree structure above the level of the current record, and applying a deterministic transformation to the item ID of the new item to determine one of the identified number of records, and repeating from I) with the determined record now as the current record; wherein over the group, at least one or some of the respective item IDs are added at least a first level above the root level via at least a first instance of II).

In embodiments, over the group, at least one or some of the respective item IDs may be added at least a second level above the root level via at least a second instance of II) after at least one repetition of II).

In embodiments, over the group, at least some of the respective item IDs may be added to different records within a same level above the root level.

In embodiments, said transformation may have a uniform output distribution.

In embodiments, said transformation may comprise hashing the item ID into an unsigned integer, and taking the unsigned integer modulo the number of records at the next level.

In embodiments, the number of records at the next level may be pre-stored in at least one of the records below the next level, and said determining of the number of records at the next level may comprise reading the number therefrom.

In embodiments, the number of records in each of all levels may be pre-stored stored in the record at the root level, and said determining of the number of records at the next level may comprise reading the number from the root record.

In embodiments, the number of records may be pre-stored in the respective value of the respective record in the first record structure.

In embodiments, the method may comprise providing a storage function enabling a client application to initiate the addition of one or more of said new records by submitting a storage request message including the respective item ID.

In embodiments, the method may comprise providing a search function enabling a client application submitting a search request message including a queried item ID as the key, and to thereby initiate a search to determine whether the queried item ID is found in said group in the first record structure. The retrieval function may perform the search by, starting at the root level of the tree structure with the root record as the current record: III) determining whether the queried item ID is found in the current record, and IV) if not, identifying the number of records at the next successive level of the tree structure above the level of the current record, and applying the same deterministic transformation as used in II) to the requested item ID in order to determine which of the identified number of records to try next, and repeating from III) with the determined record now as the current record.

In embodiments, the method may comprise providing a retrieval function enabling a requesting client application to retrieve a requested one of the items from the second record structure by submitting a retrieval request message including the respective item ID.

In embodiments, the retrieval function may further enable a requesting client application to retrieve the item IDs of said group from the first record structure by submitting a retrieval request message including the respective index or a trunk part thereof.

In embodiments, the requested item or group of IDs may be returned to the requesting client application over a plurality of response messages, each response message comprising a different respective continuation token to distinguish between the response messages.

In embodiments, said maintaining of the key-value store may further comprise: subsequently updating and/or deleting one or more of the new item IDs that were added to the first record structure.

In embodiments, the method may comprise providing an updated and/or deletion function enabling a client application to update or delete a requested one of the items by submitting an update and/or deletion request message, respectively, including the respective item ID.

In embodiments, the method may comprise storing, in the respective value of each of one or more records in the second record structure, a copy of the respective index of the record from the first record structure in which the respective item ID is stored. The update and/or deletion may comprise referencing the copy of the index stored in the second record structure in order to perform a reverse look-up.

In embodiments, each item may comprises one of: at least one document, content of a site, at least one stored communication, and/or at least one user profile; and/or metadata of at least one document, site, communication and/or user profile.

In embodiments, the indexes of the records in the tree structure may comprise a common trunk part specifying one or more properties shared by the respective items of the item IDs in said group, and an enumerated part distinguishing between the records in the tree structure. In this case said transformation may generate an output denoting the determined record by reference to the enumerated part.

For instance the trunk may specify one of: items with greater than a threshold degree of popularity, the items within a site, and/or the items of a given tenant.

According to another aspect disclosed herein, there is provided a computer program embodied on computer-readable storage and comprising code configured so as when run on one or more processors to perform the method of any embodiment disclosed herein.

According to another aspect disclosed herein, there is provided a server system implemented in one or more server units at one or more geographic sites, the server system comprising: processing apparatus comprising one or more processors, and memory comprising one or more one or more memory devices; wherein the memory stores software arranged to run on the processing apparatus, the software being configured so as when run to perform the method of any embodiment disclosed herein.

Other variants and applications of the disclosed techniques may become apparent to a person skilled in the art once given the present disclosure. The scope of the present disclosure is not limited by the above-described embodiments but only by the accompanying claims.

The invention claimed is:

1. A computer-implemented method comprising:
maintaining a key-value store comprising multiple records, wherein each record comprises a respective key and a respective value mapped to the respective key, wherein each value is restricted to a maximum size limit in terms of quantity of data;
wherein the key-value store comprises a first record structure in which each key comprises a different index and each value comprises respective item IDs, and wherein the key-value store comprises a second record structure in which each key comprises a different one of the item IDs and each value comprises a respective item of data;
wherein said maintaining comprises adding new item IDs to a group in the first record structure;
wherein the new item IDs are added to a tree structure formed from records of the first record structure, comprising a root record at a root level and a plural number of records at a successive level;
wherein each new item ID of the group is added in turn by, starting at the root level with the root record as a current record:
I) determining whether the value of the current record will exceed the maximum size limit if the new item ID is included therein;
including the new item ID in the value of the current record based on the value of the current record not exceeding the maximum size limit;
II) identifying a number of records at the next successive level of the tree structure above the level of the current record based on the value of the current record exceeding the maximum size limit, and applying a deterministic transformation to the item ID of the new item to determine one of the identified number of records, and repeating from I) with said determined one of the records as the current record; and
wherein over the group, a respective item ID is added at least a first level above the root level via at least a first instance of II).

2. The method of claim 1, wherein over the group, a respective item ID is added at least a second level above the root level via at least a second instance of II) after at least one repetition of II).

3. The method of claim 1, wherein over the group, at least some of the respective item IDs are added to different records within a same level above the root level.

4. The method of claim 1, wherein said deterministic transformation has a uniform output distribution.

5. The method of claim 4, wherein said deterministic transformation comprises hashing the item ID into an unsigned integer, and taking the unsigned integer modulo the number of records at the next level.

6. The method of claim 1, wherein the number of records at the next level is stored in at least one of the records below the next level, and determining of the number of records at the next level comprises reading the number therefrom.

7. The method of claim 6 wherein the number of records in each of all levels is stored in the record at the root level, and determining of the number of records at the next level comprises reading the number from the root record.

8. The method of claim 1, comprising providing a storage function enabling a client application to initiate addition of at least one of said new records by submitting a storage request message including the respective item ID.

9. The method of claim 1, comprising providing a search function enabling a client application submitting a search request message including a queried item ID as the key, and to thereby initiate a search to determine whether the queried item ID is found in said group in the first record structure;
wherein a retrieval function performs the search by, starting at the root level of the tree structure with the root record as the current record:
III) determining whether the queried item ID is found in the current record, and
IV) identifying the number of records at the next successive level of the tree structure above the level of the current record based on the queried item ID not being found in the current record, and applying the same deterministic transformation as used in II) to a requested item ID in order to determine which of the identified number of records to try next, and repeating from III) with the determined record as the current record.

10. The method of claim 1, comprising:
providing a retrieval function enabling a requesting client application to retrieve a requested one of the items from the second record structure by submitting a retrieval request message including the respective item ID;
wherein the retrieval function further enables a requesting client application to retrieve the item IDs of said group from the first record structure by submitting a retrieval request message including the respective index or a trunk part thereof.

11. The method of claim 1, wherein said maintaining of the key-value store further comprises: at least one of subsequently updating or deleting at least one of the new item IDs that were added to the first record structure; and
the method comprises providing at least one of an updated or deletion function enabling a client application to update or delete a requested one of the items by submitting at least one of an update or deletion request message, respectively, including the respective item ID.

12. The method of claim 11, comprising storing, in the respective value of each of at least one of the records in the second record structure, a copy of the respective index of the record from the first record structure in which the respective item ID is stored;
wherein the at least one of the update or deletion comprises referencing the copy of the index stored in the second record structure to perform a reverse look-up.

13. The method of claim 1, wherein the indexes of the records in the tree structure comprise a common trunk part specifying a property shared by the respective items of the item IDs in said group, and an enumerated part distinguishing between the records in the tree structure; wherein said deterministic transformation generates an output denoting the determined record by reference to the enumerated part.

14. A hardware memory device comprising a computer program embodied on computer-readable storage and comprising code configured so as when run on a processor to perform a method comprising:
maintaining a key-value store comprising multiple records, wherein each record comprises a respective key and a respective value mapped to the respective key, wherein each value is restricted to a maximum size limit in terms of quantity of data;
wherein the key-value store comprises a first record structure in which each key comprises a different index and each value comprises respective item IDs, and wherein the key-value store comprises a second record structure in which each key comprises a different one of the item IDs and each value comprises a respective item of data;
wherein said maintaining comprises adding new item IDs to a group in the first record structure;
wherein the new item IDs are added to a tree structure formed from records of the first record structure, comprising a root record at a root level and a plural number of records at a successive level;
wherein each new item ID of the group is added in turn by, starting at the root level with the root record as a current record:
I) determining whether the value of the current record will exceed the maximum size limit if the new item ID is included therein;
including the new item ID in the value of the current record based on the value of the current record not exceeding the maximum size limit;
II) identifying a number of records at the next successive level of the tree structure above the level of the current record based on the value of the current record exceeding the maximum size limit, and applying a deterministic transformation to the item ID of the new item to determine one of the identified number of records, and repeating from I) with said determined one of the records as the current record; and
wherein over the group, a respective item ID is added at least a first level above the root level via at least a first instance of II).

15. The hardware memory device of claim 14, wherein over the group, a respective item ID is added at least a second level above the root level via at least a second instance of II) after at least one repetition of II).

16. The hardware memory device of claim 14, wherein over the group, at least some of the respective item IDs are added to different records within a same level above the root level.

17. The hardware memory device of claim 14, wherein said transformation has a uniform output distribution.

18. A server system implemented in server unit at a geographic site the server system comprising:
processing apparatus comprising processor, and
memory comprising memory device;
wherein the memory stores software arranged to run on the processing apparatus, the software being configured so as when run to perform a method comprising:

maintaining a key-value store comprising multiple records, wherein each record comprises a respective key and a respective value mapped to the respective key, wherein each value is restricted to a maximum size limit in terms of quantity of data;

wherein the key-value store comprises a first record structure in which each key comprises a different index and each value comprises respective item IDs, and wherein the key-value store comprises a second record structure in which each key comprises a different one of the item IDs and each value comprises a respective item of data;

wherein said maintaining comprises adding new item IDs to a group in the first record structure;

wherein the new item IDs are added to a tree structure formed from records of the first record structure, comprising a root record at a root level and a plural number of records at a successive level;

wherein each new item ID of the group is added in turn by, starting at the root level with the root record as a current record:

I) determining whether the value of the current record will exceed the maximum size limit if the new item ID is included therein;

including the new item ID in the value of the current record based on the value of the current record not exceeding the maximum size limit;

II) identifying a number of records at the next successive level of the tree structure above the level of the current record based on the value of the current record exceeding the maximum size limit, and applying a deterministic transformation to the item ID of the new item to determine one of the identified number of records, and repeating from I) with said determined one of the records as the current record, wherein the transformation comprises hashing the item ID into an unsigned integer, and taking the unsigned integer modulo the number of records at the next level, such that the transformation has a uniform output distribution; and wherein over the group, a respective item ID is added at least a first level above the root level via at least a first instance of II).

19. The server system of claim 18, wherein over the group, a respective item ID is added at least a second level above the root level via at least a second instance of II) after at least one repetition of II).

20. The server system of claim 18, wherein over the group, a respective item ID is added to different records within a same level above the root level.

* * * * *